United States Patent [19]

Nakagawa et al.

[11] Patent Number: 4,649,436

[45] Date of Patent: Mar. 10, 1987

[54] IMAGE PROCESSING APPARATUS IN FILM IMAGE PHOTOTELEGRAPHY

[75] Inventors: Yukio Nakagawa; Ryuzo Motoori, both of Kawasaki, Japan

[73] Assignee: Nippon Kogaku K. K., Tokyo, Japan

[21] Appl. No.: 694,144

[22] Filed: Jan. 23, 1985

[30] Foreign Application Priority Data

Jan. 26, 1984 [JP] Japan .................. 59-12649

[51] Int. Cl.[4] .............................................. H04N 1/40
[52] U.S. Cl. ..................................... 358/280; 358/282; 358/293; 358/294
[58] Field of Search ............... 358/280, 282, 284, 288, 358/293, 294

[56] References Cited

U.S. PATENT DOCUMENTS

| 4,234,895 | 11/1980 | Sommer et al. | 358/282 |
| 4,328,426 | 5/1982 | D'Ortenzio | 358/280 |
| 4,439,790 | 3/1984 | Yoshida | 358/294 |
| 4,459,619 | 7/1984 | Yoshida | 358/293 |
| 4,514,767 | 4/1985 | Kubota et al. | 358/280 |
| 4,533,959 | 8/1985 | Sakurai | 358/280 |
| 4,554,592 | 11/1985 | Yoshida | 358/294 |
| 4,556,918 | 12/1985 | Yamazaki et al. | 358/280 |
| 4,562,486 | 12/1985 | Suzuki et al. | 358/282 |

Primary Examiner—Henry C. Yuen
Attorney, Agent, or Firm—Shapiro and Shapiro

[57] ABSTRACT

An image processing apparatus for a phototelegraphic apparatus for transmitting a film image has a frame for holding a film in which an image is optically recorded, a line sensor consisting of an array of CCDs for reading the film image, a main scanning direction frame signal elimination circuit for eliminating signal components corresponding to the frame from maximum and minimum densities detected by a peak hold circuit among main scanning image signals, and a microcomputer for detecting signal components corresponding to the frame from subscanning image signals. Noise components in image signals obtained by the line sensor due to the presence of the frame or soiling or scratching of the film are eliminated with a simple circuit configuration.

5 Claims, 12 Drawing Figures

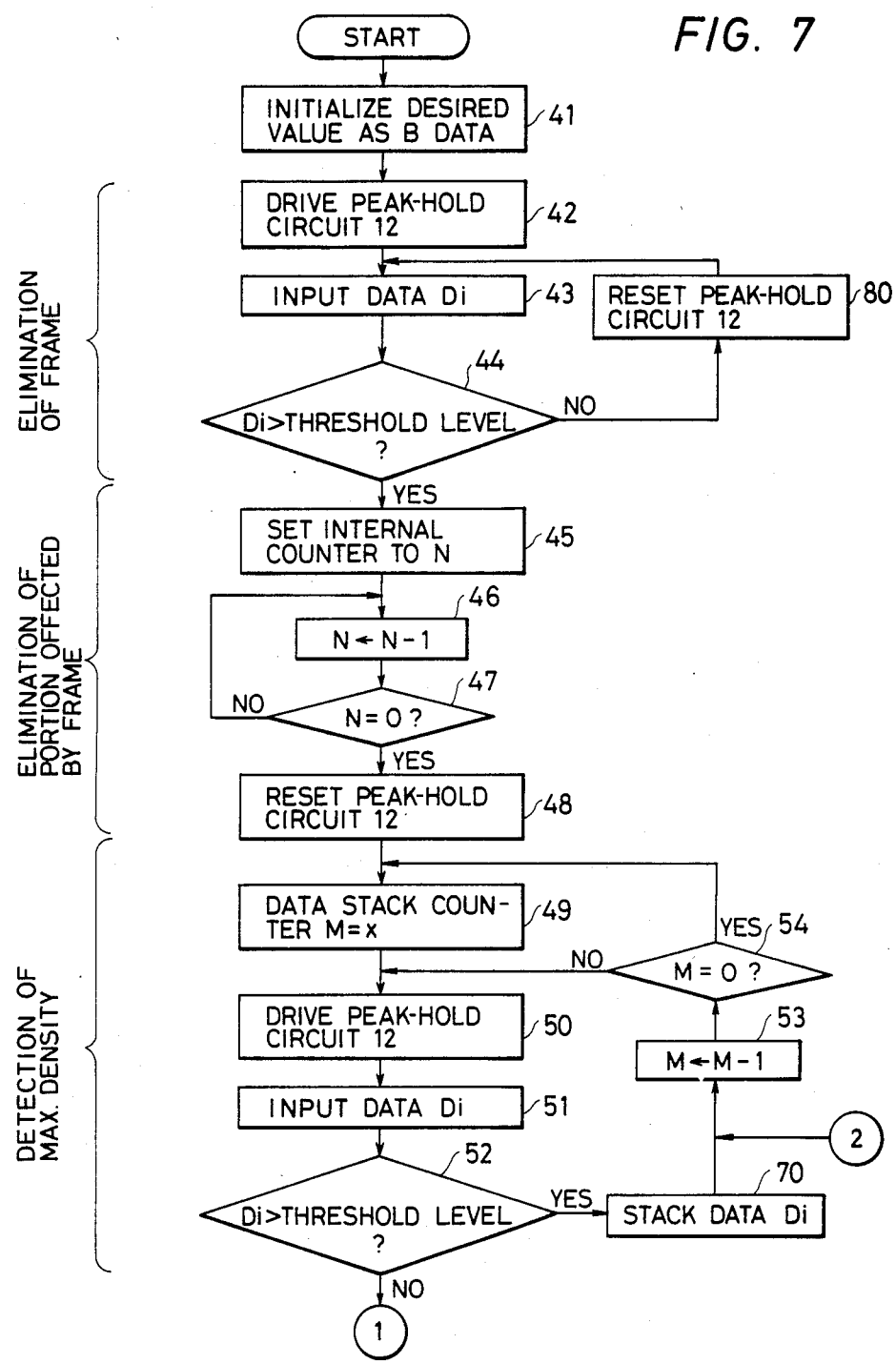

FIG. 9
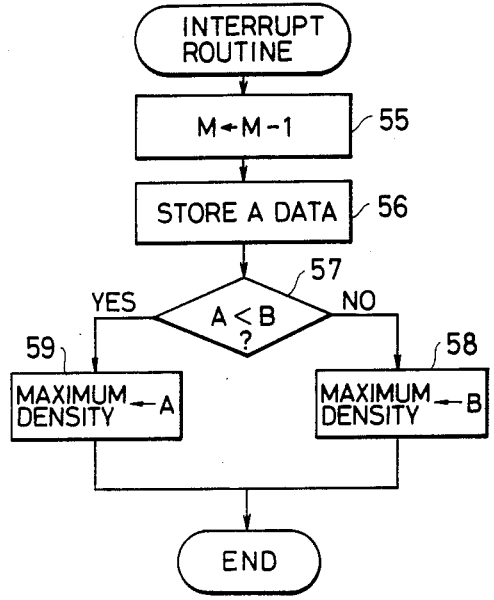
FIG. 8
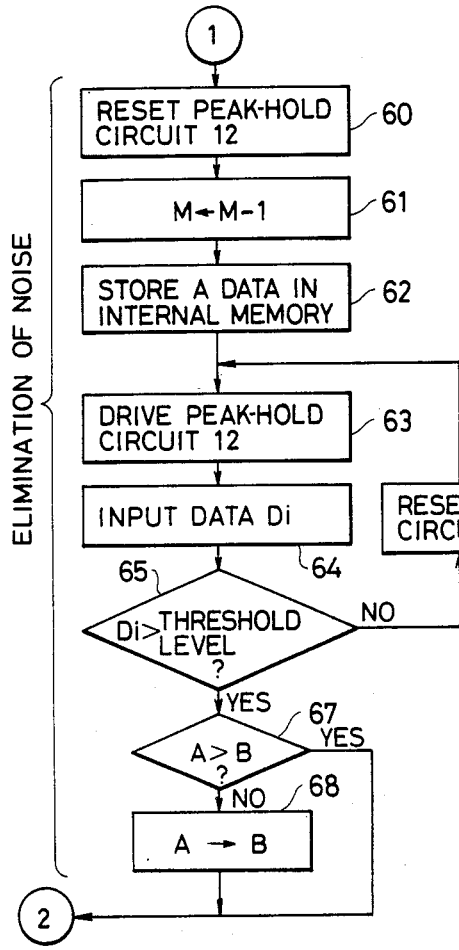
FIG. 10
STACK MEMORY
| ADDRESS | DATA |
|---|---|
| A1 | D1 |
| A2 | D2 |
| A3 | D3 |
| ⋮ | ⋮ |
| Ax | Dx |

IMAGE PROCESSING APPARATUS IN FILM IMAGE PHOTOTELEGRAPHY

BACKGROUND OF THE INVENTION

1. Field of the Invention

The present invention relates to an image information processing system which performs photoelectric conversion of an image optically recorded on a medium such as a transparent film or nontransparent print paper.

2. Description of the Prior Art

An apparatus is conventionally known which converts image information optically recorded on a medium such as a developed film or printed paper into electrical signals and transmits the obtained electrical signals through a telephone line.

SUMMARY OF THE INVENTION

It is an object of the present invention to provide an improved image processing apparatus for directly performing phototelegraphy of a developed positive or negative film.

In order to achieve the above object of the present invention, in image processing, the arrangement direction of photoelectric conversion elements in a line sensor is defined as the main scanning direction, the mechanical moving direction of the line sensor relative to the image is defined as the subscanning direction, an optically recorded image medium is held by a frame at a suitable position within a scanning range of the line sensor, image information is converted into electrical signals by scanning the line sensor along the main and subscanning directions, and a signal representing the frame included in an image signal obtained by main scanning by the line sensor is eliminated.

BRIEF DESCRIPTION OF THE DRAWINGS

FIGS. 7, 8 and 9 are flow charts of a program for detecting the maximum density in subscanning of the present invention; and FIG. 10 is a table showing a static memory used in the processing of the flow according to the present invention.

DESCRIPTION OF THE PREFERRED EMBODIMENTS

Figure 1:
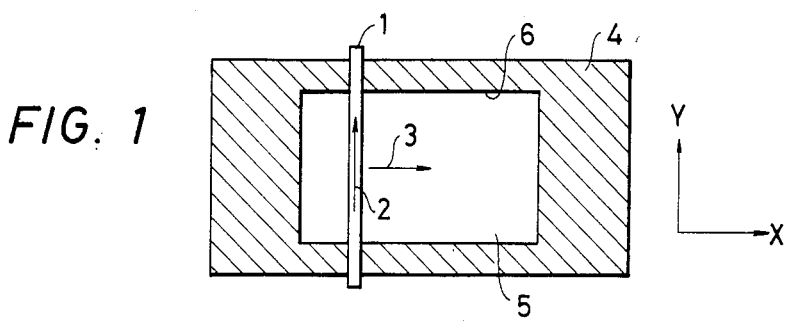
FIG. 1 is a representation of a scanning mechanism of a line sensor used in the present invention.

FIG. 1 is a representation showing an image processing method and a scanning structure of a line sensor according to the present invention.

Referring to FIG. 1, a CCD line sensor consists of an array of CCDs as photoelectric conversion elements. The arrangement direction of the CCDs of the CCD line sensor 1 along an arrow 2 is the main scanning direction, and the mechanical moving direction of the sensor indicated by arrow 3 and perpendicular to the arrow 2 is the subscanning direction. A film holder 4 for holding a developed positive or negative film 5 is arranged at a position corresponding to the CCD line sensor 1. The film holder 4 is mounted on an X-Y stage (not shown) which is movable relative to the CCD line sensor 1 along X-and Y-directions parallel to the moving surface of the line sensor 1. The film holder 4 has a frame 6 for holding an image portion of the film 5.

Figure 2:
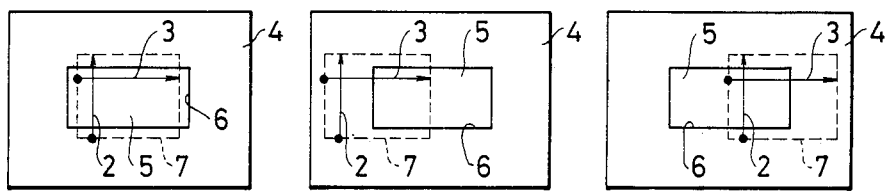
FIGS. 2(A), 2(B) and 2(C) are diagrams showing the relative positional relationships between the line sensor and the film holder.

FIGS. 2(A), 2(B) and 2(C) show the scanning range of the line sensor and the relative positional relationship of the frame of the film holder 4 in the line sensor scanning structure in FIG. 1. In FIG. 2(A), a scanning range 7 of the CCD line sensor 1 indicated by the dotted line is positioned with respect to the frame 6 of the film holder 4 in one-to-one correspondence. In this case, the influence or effect of the frame 6 is not seen for the subscanning direction of the line sensor 1 which is indicated by arrow 3. However, the upper and lower edges of the frame 6 overlap with the film in the main scanning direction of the line sensor which is indicated by arrow 2. FIG. 2(B) shows positioning for extracting the left half of the image portion of the film 5, and FIG. 2(C) shows positioning for extracting the right half of the image portion of the film 5. In either case, the effect of the frame 6 is present in the main and subscanning directions of the line sensor 1.

Figure 3:
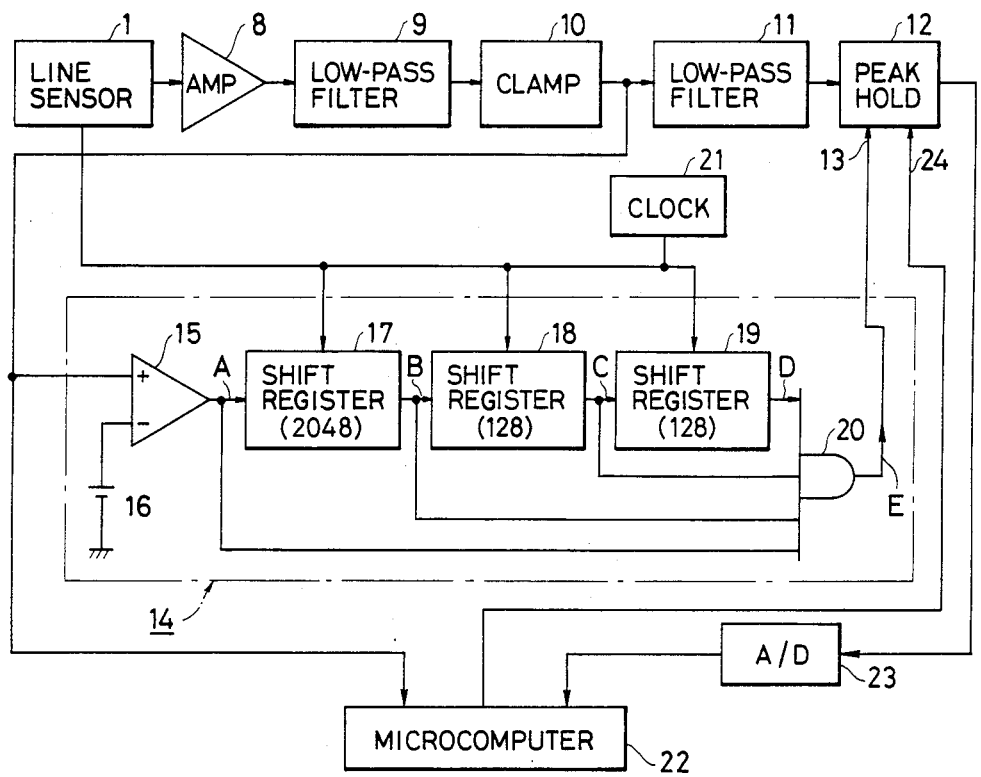
FIG. 3 is a block diagram according to an embodiment of the present invention.

FIG. 3 is a block diagram according to an embodiment of the present invention illustrating the scanning structure of the line sensor shown in FIG. 1.

The circuit configuration will first be described. An amplifier 8 amplifies to a suitable level a video signal obtained by main scanning of the line sensor 1. A low-pass filter 9 eliminates clock noise or the like included in an output signal from the amplifier 8. A clamp circuit 10 performs DC restoration using an operational amplifier. A low-pass filter 11 eliminates noise components due to dust or scratches included in the DC-restored output. A peak hold circuit 12 detects and holds the maximum density (minimum value of the signal) and the minimum density (maximum value of the signal) of a film image among the image signals obtained by main scanning of one line. An A/D converter 23 converts analog signals respectively representing the maximum and minimum densities into digital signals.

A main scanning direction frame signal elimination circuit 14 supplies a reset signal 13 to the peak hold circuit 12 for eliminating unnecessary signals affected by the frame 6.

The main scanning direction frame signal elimination circuit 14 has a comparator 15. The noninverting input terminal of the comparator 15 receives an image signal including the frame signal which is supplied from the clamp circuit 10. The inverting input terminal of the comparator 15 receives a frame detection level from a reference power source 16. The comparator 15 produces a signal of high level (to be referred to as H level hereinafter) while the input signal from the clamp circuit 10 is higher than the frame detection level from the reference power source 16. Shift registers 17, 18 and 19 are series-connected to the output terminal of the comparator 15. The shift register 17 produces an output in response to 2,048 clock pulses. The shift registers 18 and 19 produce outputs in response to 128 clock pulses. Outputs from the comparator 15 and the shift registers 17, 18 and 19 are supplied to an AND gate 20. The shift registers 17, 18 and 19 receive clock pulses of a predetermined frequency from a clock generator 21. The clock pulses are also supplied to the line sensor 1 as scanning pulses in the main scanning direction.

The frame signal in the subscanning direction of the CCD line sensor 1 is eliminated by software included in a microcomputer 22. An output from the clamp circuit 10 is supplied to the microcomputer 22. Since the peak hold circuit 12 is reset for each main scanning line, the maximum and minimum densities for each line are detected for the number of main scanning lines along the subscanning direction. An output from the peak hold circuit 12 is converted into a digital signal by the A/D converter 23 and the digital signal is supplied to the microcomputer 22. The microcomputer 22 supplies by means of software to be described later a reset signal 24 for resetting the peak values held by hardware by frame detection, noise detection or the like.

When the embodiment shown in FIG. 3 is summarized, the frame signal obtained by main scanning of the CCD line sensor 1 is eliminated by the main scanning direction frame signal elimination circuit 14. Meanwhile, the frame signal obtained by subscanning of the CCD line sensor 1 is eliminated by software in the microcomputer 22.

The operation of the embodiment shown in FIG. 3 will be described below.

Elimination of the frame signal (included in the image signal obtained by main scanning of the line sensor) by means of the main scanning direction frame signal elimination circuit 14 will be explained with reference to the waveform chart shown in FIG. 4.

Figure 4:
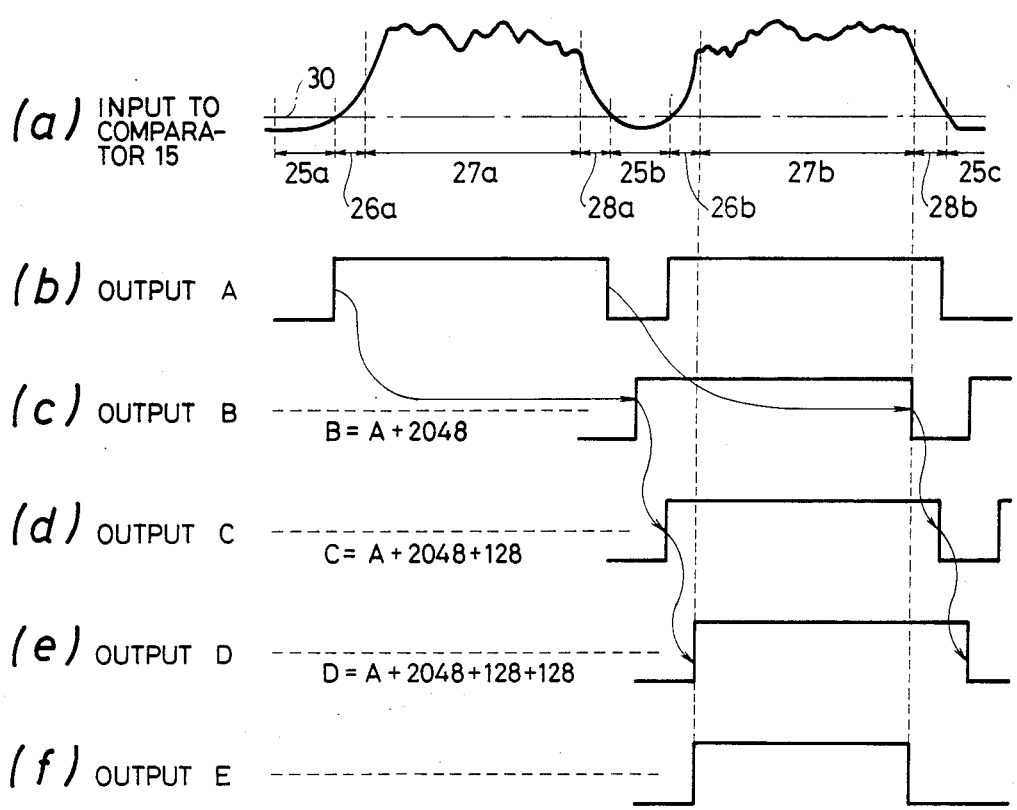
FIG. 4 shows waveform charts of signals at respective portions of a circuit for eliminating the frame signal along the main scanning direction in the embodiment shown in FIG. 3.

In FIG. 4, (a) shows the image signal obtained by electronically performing main scanning of one line of the CCD line sensor 1. This image signal corresponds to the output signal from the clamp circuit 10, i.e., the input signal to the comparator 15 in the embodiment shown in FIG. 3. In this input signal to the comparator, a portion 25a corresponds to a signal portion which is obtained by scanning the lower edge of the frame. A portion 26a is a fluctuation of the signal due to blurring caused when the frame does not coincide with the focal plane or by photocharges leaking to adjacent pixels through the substrate of the CCD line sensor (smearing). A portion 27a corresponds to an image signal obtained by main scanning of one line not affected by the frame. A portion 28a is a signal affected by the frame as in the case of the portion 26a. A portion 25b is a signal portion corresponding to the upper edge of the frame. The CCD line sensor 1 is mechanically moved during the signal portion 25b by 1 step in the subscanning direction, and a similar image signal is obtained by main scanning of the next line.

The comparator 15 produces a signal of H level when the input signal to the comparator 15 exceeds a frame detection level 30 from the reference power source 16. As a result, the comparator 15 produces a signal of H level having a duration which is a sum of the signal portions 26a and 28a affected by the frame and the image signal portion 27a corresponding to main scanning of one line.

This output signal from the comparator 15 is supplied to the shift register 17. The output from the comparator 15 is represented by A, and that from the shift register 17 is represented by B. Since the shift register 17 has 2,048 stages, it performs a shift operation, Output $B=A+2048$, and thereby delays the output from the comparator 15 for a time interval corresponding to 2,048 clocks. The 2,048-clock time interval corresponds to the image signal of main scanning of one line.

The output B from the shift register 17 is then supplied to the next shift register 18. When an output from the shift register 18 is represented by C, since the shift register 18 has 128 stages, Output $C=A+2048+128$ results. The shift register 18 thus delays the output B from the shift register 17 for a time interval corresponding to 128 clocks. The 128-clock time interval corresponds to the image signal considered to be affected by the frame edge. The output C from the shift register 18 is supplied to the shift register 19. When an output from the shift register 19 is represented by D, Output $D=A+2048+128+128$ results. The output from the shift register 18 is thus delayed by another time interval corresponding to the fame edge.

Outputs from the comparator 15 and the shift registers 17 to 19 are supplied to the AND gate 20. An output E from the AND gate 20 is given as Output $E=A \times B \times C \times D$. As can be seen from the signal waveform shown in FIG. 4, an output from the AND gate 20 corresponding to the signal of main scanning of one line becomes the portion 27b, obtained by eliminating from the image signal corresponding to main scanning of one line, the signal components corresponding to the two frame edges and signal components affected by the frame. The peak hold circuit 12 can then hold the maximum density (minimum signal level) and the minimum density (maximum signal level) of the image signal supplied to the peak hold circuit 12 during the gate period which is determined by an output from the AND gate 20.

A method of eliminating by the microcomputer 22 the image signal of the frame from the image signal obtained by subscanning in the embodiment shown in FIG. 3 will be described below.

A phototelegraphic apparatus according to the present invention performs prescanning before phototelegraphy of a film image, and controls the clamp circuit 10 in accordance with the maximum and minimum densities obtained by scanning. The flow charts shows in FIGS. 7, 8 and 9 are executed to perform prescanning.

Figure 5:
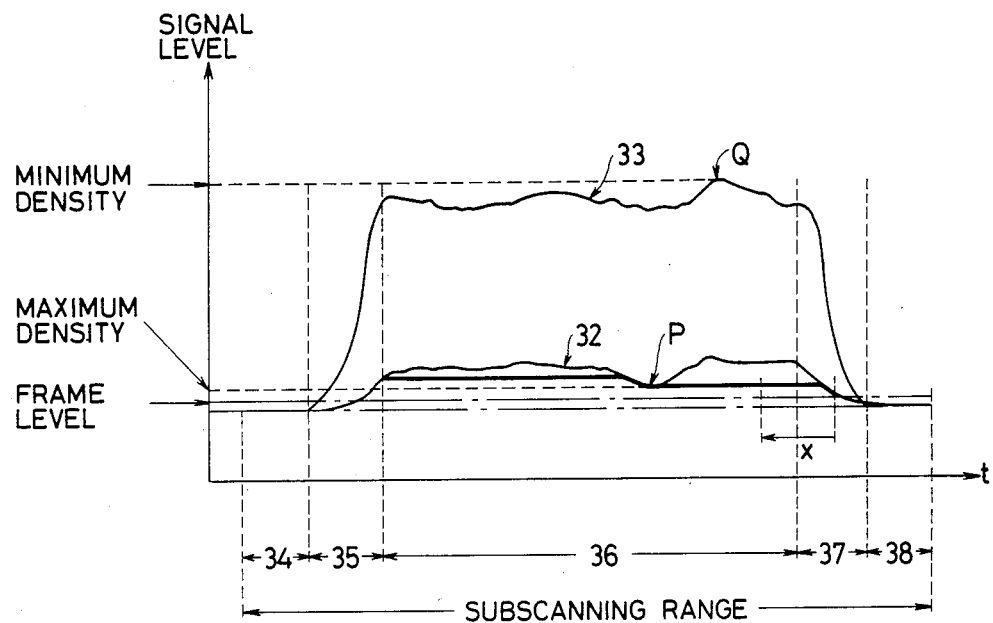
FIG. 5 shows the waveform of an image signal obtained in subscanning of the line sensor.

FIG. 5 shows the signal levels corresponding to the maximum and minimum densities obtained by one subscanning operation of the CCD line sensor 1. More specifically, FIG. 5 shows the signal levels corresponding to the maximum and minimum densities which are detected by the peak hold circuit 12 upon main scanning of each line and which are obtained as subscanning is performed in the embodiment shown in FIG. 3. Thus, a signal level 32 corresponding to the maximum density and a signal level 33 corresponding to the minimum density change in the subscanning direction along the time base. The thick line in FIG. 5 represents changes in the peak value (maximum density measurements) held by the peak hold circuit 12.

The signal levels corresponding to the maximum and minimum densities along the subscanning direction shown in FIG. 5 change in a similar manner to those of the signal obtained by main scanning of one line as shown (a) in FIG. 4. That is, within a single subscanning range, there are obtained a signal portion 34 corresponding to the frame left edge, a signal portion 35 affected by the frame, a central image signal portion 36 obtained by one subscanning line, a signal portion 37 affected by the frame right edge, and a signal portion 38 corresponding to the frame right edge.

The maximum density at point P and the minimum density at point Q in the signal levels 32 and 33 in the central signal portion 36 excluding the signal portions 34, 35, 37 and 38 are detected by software, i.e., by program control.

Figure 6:
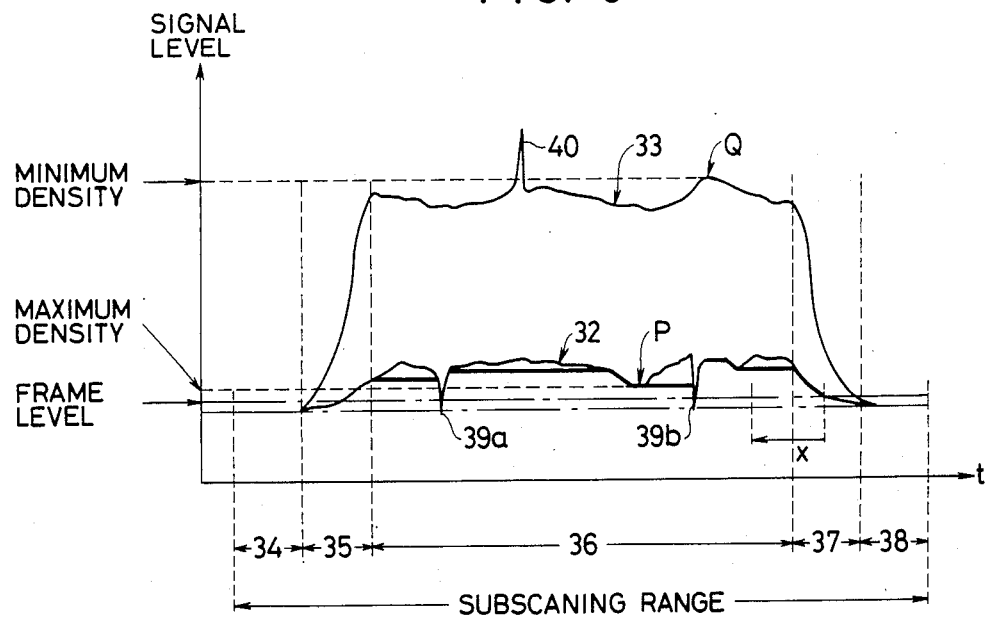
FIG. 6 shows the waveform of an image signal obtained in subscanning of the line sensor and including noise.

FIG. 5 also shows changes in signal levels when the film portion corresponding to the scanning range of the CCD line sensor is not soiled or scratched. A case will be considered wherein there is an assumed soiled or scratched portion in the scanning range. For example, when there is a soiled portion, as shown in FIG. 6, pulselike maximum densities such as noise signals 39a and 39b occur in the signal level 32. When, for example, there is a scratch in the film, a noise signal 40 corresponding to the minimum density occurs in the signal level 33.

In the signal level 33 corresponding to the signal minimum density, the pulse-like signal 40 due to a scratch, and the noise signals 39a and 39b due to soiling can be eliminated by hardware, i.e., a low-pass filter. However, if a noise signal portion has a wide area, it is difficult to eliminate it by a hardware means and it is therefore eliminated by a software means. A noise signal portion corresponding to a scratch does not generally have a wide area. Therefore, in software processing, maximum densities of wide areas corresponding to soiled portions are eliminated.

FIGS. 7, 8 and 9 show flow charts of a control program for detecting the maximum density at point P in the signal level 32 obtained by one subscanning operation as shown in FIG. 5 or 6.

Maximum density detection processing when the image does not have any soiled portion as shown in FIG. 5 will be described with reference to this program flow.

Referring to FIG. 7, when main scanning and subscanning of the CCD line sensor 1 are started, a predetermined value close to the minimum density is initially set as B data as an initial maximum density, in step 41. In step 42, by main scanning of one line of the CCD line sensor 1, peak data representing the initial maximum density is held by the peak hold circuit 12. In step 43, the peak value representing the maximum density is converted into a digital signal by the A/D converter 23 and supplied to the microcomputer 22 as peak data Di. In step 44, the peak data Di is compared with frame data which corresponds to a predetermined threshold value. When the peak data Di is smaller than the frame data, the peak hold circuit 12 is reset in step 80. Thereafter, peak data obtained by main scanning of the next line is inputted.

In this manner, processing of steps 43, 44 and 80 is repeated until the peak data exceeds the frame data in step 44. Only after the peak data exceeds the frame data, the flow proceeds to the next processing. With this processing, maximum densities smaller than the frame data will not be detected, and peak data corresponding to the frame can be eliminated.

When it is determined in step 44 that the peak data has exceeded the frame data, the flow advances to step 45. In step 45, N is set in an internal counter of the microcomputer 22. The internal counter serves to detect a signal portion 35 which is affected by the frame, as shown in FIG. 5. The value N corresponds to the experimentally determined number of main scanning lines affected by the frame edge. Every time main scanning of one line is completed, the internal counter counts down by N←N−1, in step 46. In step 47, it is determined whether the count of the internal counter is N=0. After a predetermined period of time, the count of the internal counter reaches 0 and the next processing is performed. In steps 45, 46 and 47, detection of the maximum density by a software means is interrupted for a predetermined period of time corresponding to the set value N of the internal counter in order to eliminate a signal portion affected by the frame, i.e., the signal portion 35 in FIG. 5.

When it is determined in step 47 that the predetermined period has elapsed (N=0), the peak hold circuit 12 is reset in step 48. Then, in step 49, a data stack counter in the microcomputer 22 is set. The data stack counter is a ring counter having a predetermined number of stages, i.e., x stages. The data stack counter is set such that M=x. A stack memory in the microcomputer 22 is accessed by an address counted by the data stack counter so as to store a maximum of x peak data Di.

After the data stack counter is set to that M=x in step 49, the peak hold circuit 12 operates in the main scanning of the next line in step 50 so as to input corresponding peak data Di in step 51. A comparison of the peak data Di with the frame data as in step 44 is performed in step 52. As can be seen from FIG. 5, since no peak data is smaller than the frame data in the central signal portion 36, the flow always advances to step 70. In step 70, the peak data Di inputted in step 51 is stored at the address x of the stack memory which is designated by the data stack counter. In step 53, the data stack counter counts down so that M←M−1. In step 54, it is determined whether M=0. In the initial scanning operation, M=x−1. Therefore, the peak hold circuit 12 is operated in the main scanning of the next line in step 50. Input of the next peak data Di and storage of the data in the stack memory are performed. Similar processing is repeated. When x peak data Di are stored in the data stack counter, the flow returns to step 49. In step 49, the data stack counter is set such that M=x, and this operation is repeated.

When the flow returns to step 49 after this operation, x peak data D1 to Dx are stored at addresses A1 to Ax of the stack memory, as shown in FIG. 10.

More specifically, in the signal waveform shown in FIG. 5, initial peak data obtained after resetting of the peak hold circuit 12 upon completion of the signal portion 35 affected by the frame is held by the peak hold circuit 12. Therefore, x peak data of the same value are stored in the stack memory. When the peak data stored from a point before point P corresponding to the maximum density changes and the scanning point passes beyond point P, the peak data at the point P held by the peak hold circuit 12 are sequentially stored in the stack memory.

When such data storage processing is repeated and the scanning point passes the central signal portion 36 and enters the signal portion 37 affected by the frame, the peak data detected by the peak hold circuit 12 are sequentially rewritten as the signal values decrease. Thus, completion of movement of the CCD line sensor 1 in FIG. 1 along the X-direction for subscanning is detected by a device (not shown), and an interrupt routine as shown in FIG. 9 is executed.

The interrupt routine shown in FIG. 9 is executed upon completion of movement of the CCD line sensor 1 along the X-direction. In this routine, in step 55, the data stack counter counts down such that M←M−1. In step 56, the peak data stored at an address corresponding to the counted down value of the stack counter is stored as A data.

In this manner, the peak data (corresponding to the maximum density at point P), prior to that corresponding to the frame level of the signal portion 37 shown in FIG. 5 by (X−1) main scanning operations, is extracted as A data by counting down the data stack counter. In step 57, the A data is compared with B data extracted in step 41 in FIG. 7. Since the A data is necessarily smaller than the B data, a series of processing operations is completed after determining the A data as maximum density data.

Processing will now be described with reference to FIG. 6 wherein a noise peak due to a soiled portion occurs in the central signal portion 36.

Processing prior to occurrence of the noise peak 39a is the same as that shown in FIG. 5. That is, data storage processing in steps 49 to 54 of the flow chart shown in FIG. 7 is repeated. When a noise peak below the frame level is detected during this processing, it is discriminated in step 52 and the flow advances to processing shown in FIG. 8.

In the processing shown in FIG. 8, in step 60, the peak hold circuit 12 is reset. When, in step 61, the data stack counter counts down such that M←M−1. The oldest data in the stack memory as shown in FIG. 10. i.e., the peak data prior to the current peak data by (x−1) peak data is stored in the internal memory as A data in step 62.

When the peak hold operation of the next line is performed in step 63, the peak data is inputter in step 64. In step 65, the input peak data is compared with the frame data to check if the noise peak is continuous. If YES in step 65, the peak hold circuit 12 is reset in step 66. When it is determined in step 65 that the input peak data exceeds the frame data, the flow advances to step 67. Therefore, the noise peak is not stacked as peak data by means of software, and erroneous detection of a maximum density attributable to a soiled portion can be eliminated.

In step 67, the A stacked in step 62 is compared with the initial B data. The smaller data is stacked as updated B data in step 68, and the flow returns to the data storage processing in FIG. 7.

Similar processing to that described above is performed for the second noise peak 39b as shown in FIG. 8, and the peak data corresponding to the point P is stacked as B data.

When the frame level is detected in the signal portion 37, the interrupt routine shown in FIG. 9 is performed. In the interrupt routine, A data stacked in step 56 is compared with B data in step 57. If the A data is smaller than the B data, the A data is determined as a maximum density in step 59. However, if the B data is smaller than the A data, the B data is determined as a maximum density and a series of processing operations is completed. In the case of FIG. 6, the B data is detected as a maximum density.

The flow chart shown in FIGS. 7, 8 and 9 is described with reference to a case wherein a maximum density in the signal level 32 shown in FIG. 5 or 6 is detected. However, in the case of a minimum density in the signal level 33, since the noise peak 40 due to a scratch can be eliminated by a low-pass filter, the minimum density can be detected from the video signal by subscanning in which the signal corresponding to the portion affected by the frame is eliminated, in accordance with the flow chart described above from which processing of noise elimination shown in FIG. 8 is omitted. Note that step 52 shown in FIG. 7 can also be omitted.

I claim:

1. an apparatus having a frame for holding an optically recorded medium and a line sensor including a plurality of photoelectric conversion elements aligned in one direction, said line sensor being moved in another direction substantially perpendicular to said one direction so as to scan said medium held by said frame and generate a plurality of image signals continuously, corresponding to respective scanning lines, said apparatus comprising:
    (a) comparing means for comparing a level of each of said image signals with a reference level and producing a comparing signal;
    (b) detecting means for detecting a minimum level of each of said image signals; and
    (c) control means for controlling the period of time during which said detecting means detects the minimum level of each of said image signals in accordance with said comparing signal.

2. An apparatus according to claim 1, wherein said control means produces a frame eliminating signal in accordance with said comparing signal, and wherein said detecting means detects the minimum level of the image signal of a scanning line next to as given scanning line in accordance with said comparing signal corresponding to the given scanning line.

3. An apparatus according to claim 2, wherein said control means includes delay means for delaying said comparing signal and gate means for producing an output signal corresponding to said comparing signal delayed by said delay means.

4. An apparatus according to claim 1, wherein said control means includes a plurality of shift registers which are connected in series.

5. An apparatus having a frame for holding an optically recorded medium and a line sensor including a plurality of photoelectric conversion elements aligned in one direction, said line sensor being moved in another direction substantially perpendicular to said one direction so as to scan said medium held by said frame and generate a plurality of image signals continuously, corresponding to respective scanning lines, said apparatus comprising:
    (a) detecting means for detecting a minimum level of each of said image signals and producing a minimum signal;
    (b) comparing means for comparing each minimum level with a predetermined level and producing a comparing signal;
    (c) counter means for counting the number of said image signals in response to said comparing signal, said counter means producing an output signal when the counted number reaches a predetermined number;
    (d) memory means; and
    (e) storing means responsive to the output signal from said counter means to store said minimum signal in said memory means.

* * * * *